(12) United States Patent
Hariharan (10) Patent No.: US 8,849,866 B2
(45) Date of Patent: Sep. 30, 2014

(54) METHOD AND COMPUTER PROGRAM PRODUCT FOR CREATING ORDERED DATA STRUCTURE

(75) Inventor: Trichur Easwaran Hariharan, Chennai (IN)

(73) Assignee: Infosys Limited (IN)

( * ) Notice: Subject to any disclaimer, the term of this patent is extended or adjusted under 35 U.S.C. 154(b) by 616 days.

(21) Appl. No.: 12/709,599

(22) Filed: Feb. 22, 2010

(65) Prior Publication Data

US 2011/0208782 A1 Aug. 25, 2011

(51) Int. Cl.
*G06F 7/00* (2006.01)
*G06F 17/30* (2006.01)

(52) U.S. Cl.
CPC .... *G06F 17/30988* (2013.01); *G06F 17/30958* (2013.01)
USPC ............................................................ 707/801

(58) Field of Classification Search
CPC .................. G06F 17/30457; G06F 17/30477; G06F 17/30572; G06F 17/30592
USPC ......................................................... 707/801
See application file for complete search history.

(56) References Cited

U.S. PATENT DOCUMENTS

| 5,247,665 | A  | * | 9/1993  | Matsuda et al. .................... 1/1 |
| 7,505,960 | B2 | * | 3/2009  | Travison et al. .................... 1/1 |
| 7,865,608 | B1 | * | 1/2011  | Schuba et al. ................ 709/231 |
| 7,895,211 | B2 | * | 2/2011  | Loeb ............................ 707/747 |
| 2001/0042204 | A1 | * | 11/2001 | Blaker et al. .................. 713/165 |
| 2003/0074634 | A1 | * | 4/2003  | Emmelmann ................. 715/513 |
| 2005/0246370 | A1 | * | 11/2005 | Rubendall ................. 707/103 R |
| 2006/0101052 | A1 | * | 5/2006  | Netrakanti et al. ........... 707/102 |
| 2008/0183782 | A1 | * | 7/2008  | Andreev et al. .............. 708/200 |
| 2008/0235251 | A1 | * | 9/2008  | Shmueli et al. .............. 707/100 |
| 2010/0067688 | A1 | * | 3/2010  | Au et al. ......................... 380/43 |

* cited by examiner

*Primary Examiner* — Rehana Perveen
*Assistant Examiner* — Mark E Hershley
(74) *Attorney, Agent, or Firm* — Lerner, David, Littenberg, Krumholz & Mentlik, LLP (57) ABSTRACT

The present invention provides a method and computer program product for creating an ordered data structure for storing a plurality of data elements. The data elements to be stored are first arranged in an order. A plurality of keys is then generated for the ordered data elements such that the keys may be arranged in a sequence. Thereafter, one or more keys from the plurality of keys are associated with the ordered data elements such that the values of the keys maintain the requisite order among the ordered data elements. Finally, an ordered data structure is created for storing the ordered data elements along with the associated keys.

24 Claims, 7 Drawing Sheets

| Data elements | Keys |
|---|---|
| 402a — e | 404a — 5 |
| 402b — b | 404b — 2 |
| 402c — c | 404c — 3 |
| 402d — d | 404d — 4 |
| 402e — a | 404e — 1 |

| Keys | Data elements |
|---|---|
| 504a — 1 | 502a — a |
| 504b — 2 | 502b — b |
| 504c — 3 | 502c — c |
| 504f — 3.25 | 502f — d |
| 504g — 3.5 | 502g — e |
| 504h — 3.75 | 502h — f |
| 504d — 4 | 502d — g |
| 504e — 5 | 502e — h |

| Keys | Data elements |
|---|---|
| 504a — 1 | 502a — a |
| 504b — 2 | 502b — b |
| 504c — 3 | 502c — c |
| 504d — 4 | 502d — g |
| 504e — 5 | 502e — h |

METHOD AND COMPUTER PROGRAM PRODUCT FOR CREATING ORDERED DATA STRUCTURE

BACKGROUND OF THE INVENTION

The present invention relates to data structures. More specifically, the present invention relates to a method for creating an ordered data structure for storing a plurality of data elements.

In a typical data structure, each element includes a data element and a reference, for example, a pointer. Each reference stores an address of a data element of the immediately succeeding element thereby establishing an order among the data elements. Thus, the references are coupled with the respective data elements for maintaining an order between the data elements.

As the data elements and the corresponding references are coupled with each other, restructuring of the ordered data structure, for example, insertion or deletion of the data elements in the data structure, necessitates updating of the corresponding references. This results in a significant increase in the processing time if the ordered data structure contains a computationally heavy data set. Further, corruption or loss of any element in the ordered data structure results in a loss of the reference of the succeeding data element, thus rendering the subsequent elements in the data structure inaccessible.

In light of the above discussion, there is a need for a method and computer program product for creating an ordered data structure that enables de-coupling of the references and the data elements such that restructuring the ordered data structure does not necessitate updating of the corresponding references. Further, the references should have an implicit order such that corruption or loss of an element does not render subsequent elements in the data structure inaccessible.

BRIEF SUMMARY OF THE INVENTION

An object of the invention is to create an ordered data structure in which the references have an implicit order and may be arranged in an ordered sequence.

Another object of the invention is to decouple the references from each other and from the corresponding data elements, such that insertion or deletion of the data elements from the data structure does not necessitate repositioning of the corresponding references.

To achieve the objectives mentioned above, the invention provides a method and computer program product for creating an ordered data structure for storing a plurality of data elements. The data elements are first arranged in an order. Thereafter, a plurality of keys is generated for the ordered data elements such that the keys may be arranged in a sequence. The keys may be integers, alphabets or a combination thereof. One or more of the plurality of keys are then associated with the data elements such that the values of the corresponding keys maintain the requisite order among the data elements. Subsequently, an ordered data structure, for example, a hash, may be created to store the data elements with the associated keys.

As the data elements are not coupled with the associated keys, operations such as insertion or deletion of the data elements in the data structure do not necessitate updating of the keys along with the data elements. Therefore, the processing time while updating the data structure is significantly reduced. Further, unlike the keys in conventional data structures, the keys in the ordered data structure do not store a reference of the succeeding data element. Thus, corruption or loss of an element in the data structure does not render the subsequent data elements inaccessible. Also, deletion operations in the data structure do not necessitate traversing the data elements that precede the data element to be deleted. In other words, a data element and the corresponding key may be deleted independently i.e. without accessing the other data elements in the data structure. Further, the data structure also enables access to the list of data elements independently i.e. to access the list of data elements in the ordered data structure, the corresponding keys need not be accessed. The independent access of data elements minimizes access to the ordered data structure thereby reducing the chances of corruption.

BRIEF DESCRIPTION OF THE DRAWINGS

The various embodiments of the invention will hereinafter be described in conjunction with the appended drawings, provided to illustrate and not to limit the invention, wherein like designations denote like elements, and in which.

DETAILED DESCRIPTION

The invention describes a method and a computer program product for creating an ordered data structure comprising a plurality of data elements. The data elements to be stored are first arranged in an order. A plurality of keys is then generated for the ordered data elements such that the keys have an implicit order and may be arranged in an ordered sequence. Thereafter, one or more keys are associated with the ordered data elements such that the keys maintain the requisite order among the ordered data elements. Subsequently, the ordered data elements along with their corresponding keys are stored in an ordered data structure such as a hash.

Figure 1:
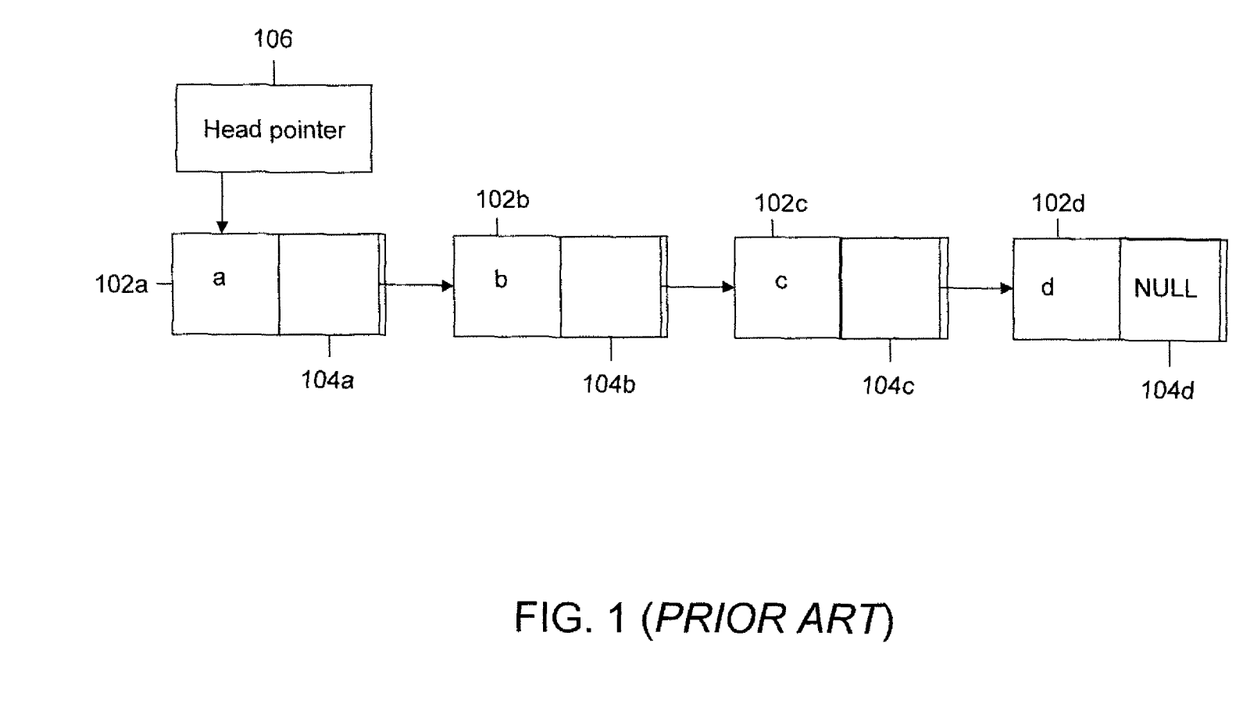
FIG. 1 illustrates an exemplary data structure as is known in the art.

FIG. 1 illustrates an exemplary data structure as is known in the art. FIG. 1 includes a plurality of data elements 102a, 102b, 102c and 102d, hereinafter referred to as data elements 102; a plurality of links 104a, 104b, 104c and 104d, hereinafter referred to as links 104; and a head pointer 106.

Each of data elements 102 in the ordered data structure is coupled with a reference such as a link from links 104. Links 104 establish an order among data elements 102 by storing a reference of an immediately succeeding data element in the data structure. For example, link 104a coupled with data element 102a stores a reference of the succeeding data element such as data element 102b. Similarly, link 104b coupled with data element 102b stores a reference of the succeeding data element 102c, and so on. Therefore, links 104 maintain an order among data elements 102.

Head pointer 106 stores a reference of the first data element such as data element 102a to enable access to the ordered data structure. Further, the value of the last link such as 104d stores a value of 'NULL' in order to indicate that no data element succeeds data element 102d.

Insertion or deletion of a data element in the ordered data structure necessitates updating of links 104. For example, if a new data element needs to be inserted between data element 102b and 102c, link 104b needs to be updated in order to store a reference of the new data element. Similarly, a new link coupled with the newly inserted data element stores a reference of data element 102c. Further, if data element 102c is deleted from the ordered data structure, link 104b needs to be updated in order to store a reference of data element 102d that succeeds data element 102c. Therefore, links 104 are coupled with data elements 102 and need to be updated during insertion and deletion operations in the ordered data structure. The updating of links 104 to store information about the respective succeeding data elements results in a significant increase in the processing time, if the ordered data structure contains computationally heavy data elements. Therefore, there is a need to create an ordered data structure in which the references or links are decoupled from the data elements such that the insertion or deletion of data elements does not necessitate updating of the links.

Figure 2:
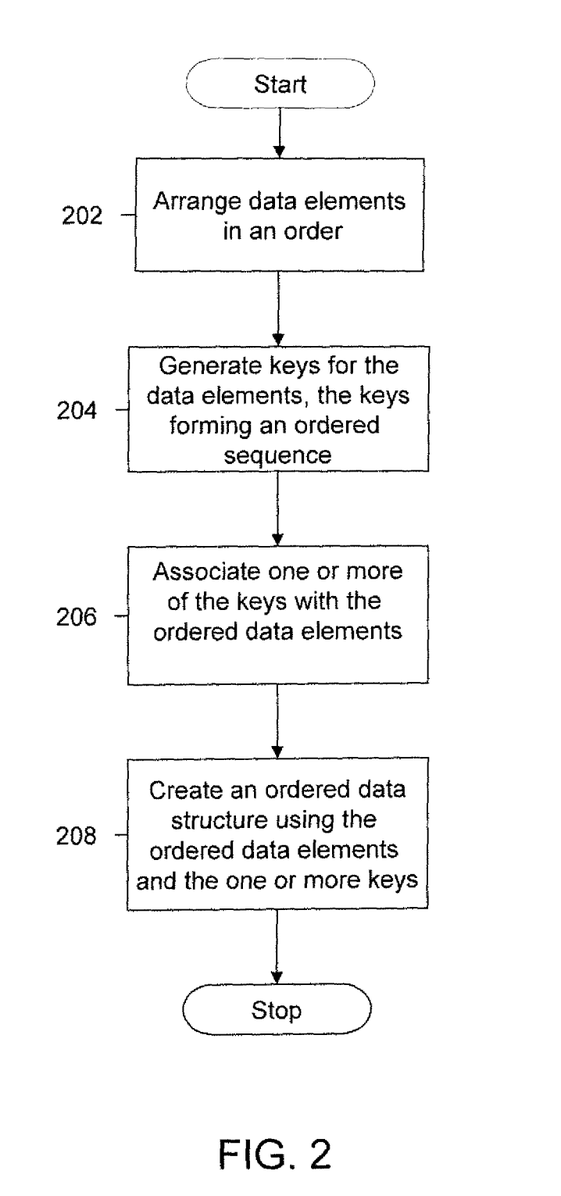
FIG. 2 illustrates a flowchart for creating an ordered data structure, in accordance with an embodiment of the invention.

FIG. 2 illustrates a flowchart for creating an ordered data structure, in accordance with an embodiment of the invention. The ordered data structure is created for storing a plurality of data elements. At 202, the data elements are arranged in the order. At 204, a plurality of keys is generated for the ordered data elements, such that the generated keys may be arranged in a sequence. In various embodiments of the invention, the plurality of keys has an implicit order among them. The plurality of keys may be real numbers, alphabets or a combination thereof. In an embodiment of the invention, the plurality of keys may be numbers from a number system of base N where N may be a natural number. For example, the plurality of keys may be numbers from a hexadecimal system i.e. a number system with base 16.

At 206, one or more of the plurality of keys are associated with the ordered data elements. The one or more keys are associated such that the values of the keys maintain the requisite order among the data elements. In an embodiment of the invention, one key may be associated with one data element. In another embodiment of the invention, one or more data elements may be associated with one key wherein the one or more data elements may be stored in a data structure, such as a linked list. Thereafter, at 208, an ordered data structure is created using the data elements and the one or more keys. In various embodiments of the invention, the ordered data structure provides a mapping between the ordered data elements and the associated keys. In an embodiment of the invention, the ordered data structure may be a hash. In another embodiment of the invention, the ordered data structure may be a lookup table.

In an embodiment of the invention, each of the data elements stored in the ordered data structure may further be a data structure. For example, a plurality of arrays may be associated with a plurality of keys and stored in the data structure wherein each key may be associated with an array.

In various embodiments of the invention, the plurality of keys is continuous such that the gap or interval between two consecutive keys may be divided to generate a plurality of intermediate keys. The generation of the intermediate keys facilitates the insertion of a plurality of new data elements between a pair of consecutive keys.

In an embodiment of the invention, the ordered data structure may be implemented using an object-oriented programming language such as C.

Figure 3:
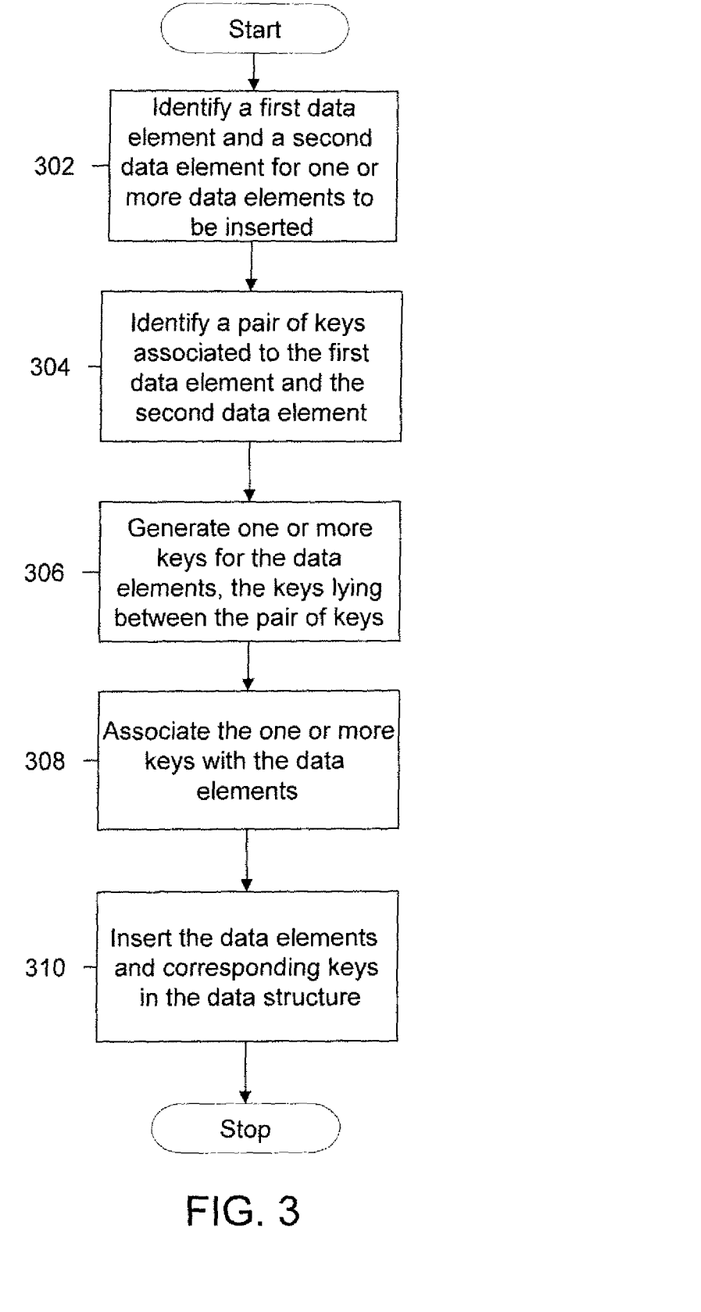
FIG. 3 illustrates a flowchart for inserting one or more data elements in an ordered data structure, in accordance with an embodiment of the invention.

FIG. 3 illustrates a flowchart for inserting one or more data elements in an ordered data structure, in accordance with an embodiment of the invention. At 302, a first data element and a second data element are identified for each of the one or more data elements to be inserted. The first data element corresponds to the data element that immediately precedes the data element that needs to be inserted in the data structure. Similarly, the second data element corresponds to the data element that immediately succeeds the data element that needs to be inserted in the data structure. Further, at 304, a pair of keys is identified such that one key from the pair of keys is associated with the first data element and a second key from the pair of keys is associated with the second data element. Thereafter, at 306, one or more keys are generated for the data elements by generating one or more ordered values wherein such that the ordered values of the newly generated keys lie between the values of the pair of keys. For example, if the identified pair of keys includes one key with a value of '4' and a second key with a value of '5', a generated key may have a value of '4.5'. At 308, each of the generated keys is associated with one or more of the one or more data elements to be inserted. The keys are associated such that the sequence among the keys maintains the order between the corresponding data elements in the ordered data structure. Thereafter, at 310, the one or more data elements and the corresponding keys are inserted in the data structure.

In another embodiment of the invention, one key may be associated with one or more data elements. The one or more data elements associated with one key may be stored in a data structure such as a linked list.

In various embodiments of the invention, an element may be prepended to the ordered data structure. In this case, only a single data element may be identified, wherein the single data element corresponds to the first data element of the ordered data structure. Similarly, in case of an append operation, only a single data element may be identified wherein the single data element corresponds to the last data element of the ordered data structure.

In an embodiment of the invention, where one key is associated with one data element, the key may also be deleted from the ordered data structure while deleting the data element. In another embodiment of the invention, where one key is associated with a data structure consisting of one or more data elements, the key may not be deleted while deleting one or more of the one or more data elements. In other words, while deleting one or more of the data elements, the data structure may be updated to contain the new set of data elements associated with the key. In various embodiments of the invention, a data element and the corresponding key may be deleted independently without accessing the other data elements in the data structure. For example, if the data element at the fourth position in the ordered data structure needs to be deleted, the list of keys may first be fetched from the ordered data structure, that may be a hash. Subsequently, the list of keys may be sorted to retrieve the key at the fourth position. Thereafter, the key and the data element corresponding to the key may be deleted from the ordered data structure. Thus, the fourth data element may be deleted from the ordered data structure without accessing the preceding or the succeeding data elements i.e. the third data element or the fifth data element.

In various embodiments of the invention, the data elements in the ordered data structure may be traversed in the order defined by the values of the keys associated with the data elements.

Figure 4:
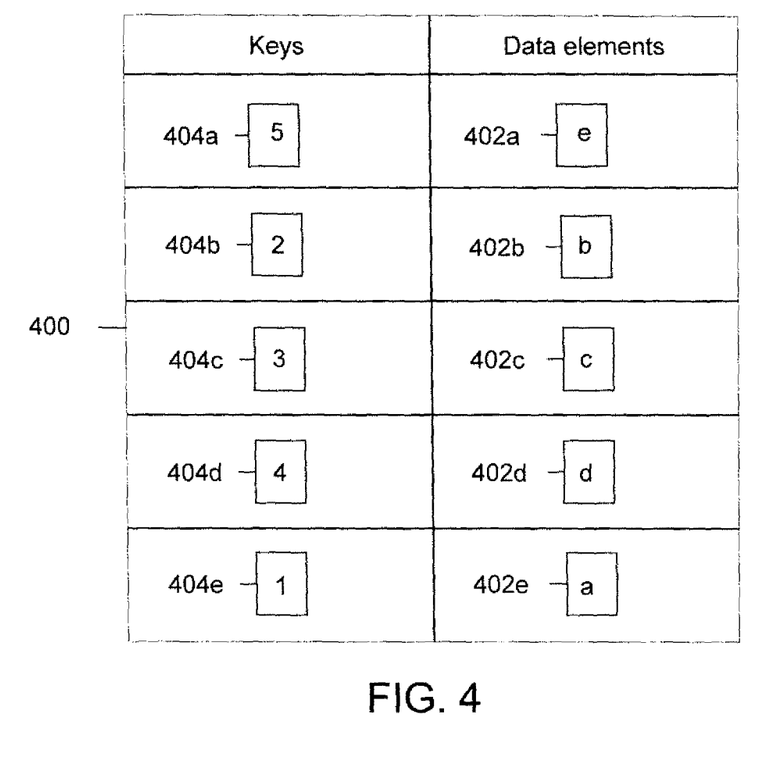
FIG. 4 illustrates a data structure for maintaining an order among a plurality of data elements, in accordance with an exemplary embodiment of the invention.

FIG. 4 illustrates a data structure for maintaining an order among a plurality of data elements, in accordance with an exemplary embodiment of the invention. FIG. 4 includes a hash 400. Hash 400 includes a plurality of data elements 402a, 402b, 402c, 402d and 402e, hereinafter referred to as data elements 402; and a corresponding set of keys 404a, 404b, 404c, 404d and 404e, hereinafter referred to as keys 404.

FIG. 4 depicts hash 400 including data elements 402 associated with keys 404. The order among data elements 402 is maintained by the values of corresponding keys 404. For example, data element 402a is associated with key 404a and data element 402b is associated with key 404b. Keys 404a and 404b may be arranged in an order according to their values. For example, key 404b may precede key 404a if keys 404 are to be arranged in an ascending order and vice versa. Accordingly, data element 402b associated with key 404b may precede data element 402a associated with key 404a and vice versa. Therefore, the requisite order may be maintained among data elements 402 associated with keys 404.

Also, keys 404 have a continuity property. In other words, the gap or interval between two consecutive keys may be divided to generate intermediate keys. The intermediate keys may be associated with one or more data elements to be inserted in the ordered data structure. Similarly, the intermediate keys may again be sub-divided to insert more data elements. Therefore, the advantage of the ordered data structure is to be able to insert a plurality of data elements between any two consecutive elements by generating a plurality of intermediate ordered values for the corresponding keys.

Typically, floating point numbers, when used as keys, are limited by the precision of a computer machine to a finite number of places after the decimal. In order to avoid such a situation, the keys may be multiplied by a factor of 10 without affecting the relative order among the keys thus maintaining the requisite order among the data elements.

In another embodiment of the invention, non-numeric suffixes may be appended to the generated keys such that the non-numeric suffixes establish a relative order among the keys with the same numeric prefix. For example, keys with values '2.5a', '2.5b' and '2.5c' may be generated to be inserted between a pair of keys with the values '2' and '3'. The non-numeric suffixes, 'a', 'b' and 'c' establish a relative order among the data elements associated with the keys.

In yet another embodiment of the invention, one or more data elements may be associated with the same key. For example, a key may be associated with a data structure that includes the data elements associated with the key. Examples of the data structure may include, but are not limited to, an array and a linked list.

In yet another embodiment of the invention, the plurality of data elements may have an implicit order among themselves. In this case, the data elements may be replicated for generating the corresponding keys for the data elements. For example, a plurality of data elements with the values 'a', 'b' and 'c' may need to be stored in the ordered data structure. In this case, a plurality of keys with values 'a', 'b' and 'c' may be generated such that the key with the value 'a' is associated with the data element with the value 'a', the key with the value 'b' is associated with the data element with the value 'b' and so on.

In yet another embodiment of the invention, the keys may be variable names generated at runtime. Dynamic variable names for the keys may be generated by using a constant and by dynamically appending an integral counter to the constant. For example, 'h' may be a constant and 'h1', 'h2' and 'h3' may be dynamically generated variable names. Further, the keys and the associated data elements may be stored in an array.

As is known in the art, a key limitation of a hash is that the keys in the hash are not stored in any order. To overcome this limitation, the list of keys may be fetched from the hash before updating the ordered data structure. The list of keys may then be sorted before traversing the ordered data structure, in order to access the data elements in a sequence. Thus, the list of keys may be re-fetched from the hash before executing an insertion or a deletion operation in the ordered data structure.

Further, the list of keys may be fetched and sorted independently without sorting the associated data elements. The associated data elements corresponding to the sorted keys may then be fetched from the hash in order to access the data elements in a sequence. Therefore, the keys are decoupled from each other and also from the corresponding data elements in the ordered data structure.

Figure 5A:
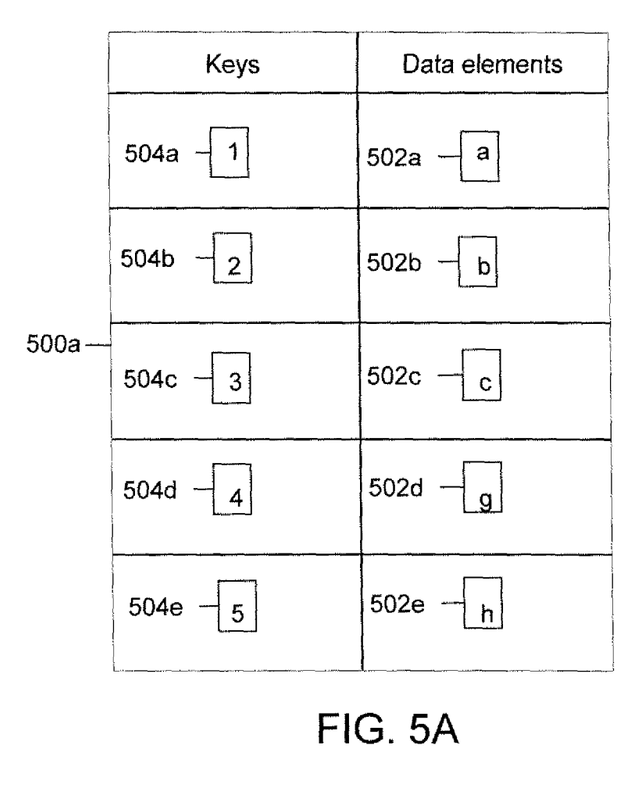
FIG. 5A illustrates a data structure before insertion of data elements.
Figure 5B:
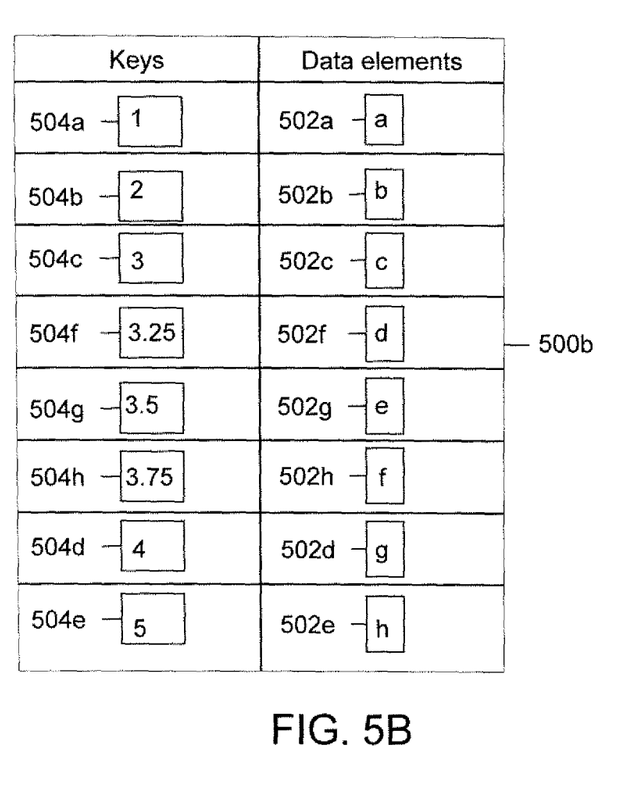
FIG. 5B illustrates a data structure after the insertion of data elements, in accordance with another exemplary embodiment of the invention.

FIG. 5A illustrates a data structure before insertion of data elements and FIG. 5B illustrates a data structure after the insertion of data elements, in accordance with another exemplary embodiment of the invention. FIG. 5A includes a hash 500a. Hash 500a includes a plurality of data elements 502a, 502b, 502c, 502d, 502e, and so forth, hereinafter referred to as data elements 502; a plurality of keys 504a, 504b, 504c, 504d, 504e, and so forth, hereinafter referred to as keys 504.

In an embodiment of the invention, each of the data elements in FIGS. 5A and 5B is associated with a corresponding key. In another embodiment of the invention, one or more data elements may be associated with one key. For example, data element 502a and 502b may be associated with key 504a.

When one or more data elements need to be inserted in the data structure, a first data element and a second data element are identified for each of the data elements, such that the first and second data elements are consecutive to each other. For each data element to be inserted, the data element that immediately precedes and succeeds the data element to be inserted is identified as the first data element and the second data element, respectively. Further, a pair of keys is identified such that the first key and the second key from the pair of keys are associated with the first data element and the second data element, respectively. Thereafter, one or more keys are generated for the data elements such that the newly generated keys lie between the corresponding pair of keys identified for the data elements. The generated keys are then associated with their respective data elements. In an embodiment of the invention, a generated key may be associated with more than one data element to be inserted. Thereafter, the data elements with their corresponding keys are inserted in hash 500a.

In an exemplary embodiment, three data elements such as 502f, 502g and 502h may be required to be inserted in hash 500a. The first data element and second data element may be identified as data element 502c and data element 502d, respectively, for each of the three data elements. Further, keys 504c and 504d may be identified as the pair of keys corresponding to the first data element 502c and second data element 502d. Keys 504f, 504g and 504h may then be generated between keys 504c and 504d. Thereafter, data elements 502f, 502g and 502h may be associated with keys 504f, 504g and 504h, respectively, such that the values of keys 504 maintain the requisite order among data elements 502. For example, key 504b may precede key 504h when keys 504 are to be arranged in an ascending order. Accordingly, data element 502b associated with key 504b may precede data element 502h associated with key 504h, thereby maintaining the requisite order between data elements 502b and 502h. Subsequently, the data elements and the associated keys may be inserted in hash 500a between data elements 502c and 502d and keys 504c and 504d, respectively.

FIG. 5B illustrates a hash 500b after the insertion of data elements 502f, 502g and 502h in hash 500a.

In an embodiment of the invention, a data element may be required to be appended to hash 500a. For example, a data element may need to be inserted after data element 502e. In this case, a single data element may be identified as data element 502e and the corresponding key as key 504e. Thereafter, a key may be generated with a value higher than the value of key 504e. The generated key may then be associated with the data element to be appended. Subsequently, the generated key and the data element may be appended to hash 500a.

In another embodiment of the invention, a data element may be required to be prepended to hash 500a. For example, a data element may need to be inserted before data element 502a. In this case, a single data element may be identified as data element 502a and corresponding key as 504a. Thereafter, a key may be generated with a value lower than the value of key 504a. The generated key may then be associated with the data element to be prepended. Subsequently, the generated key and the data element may be prepended to hash 500a.

Figure 6:
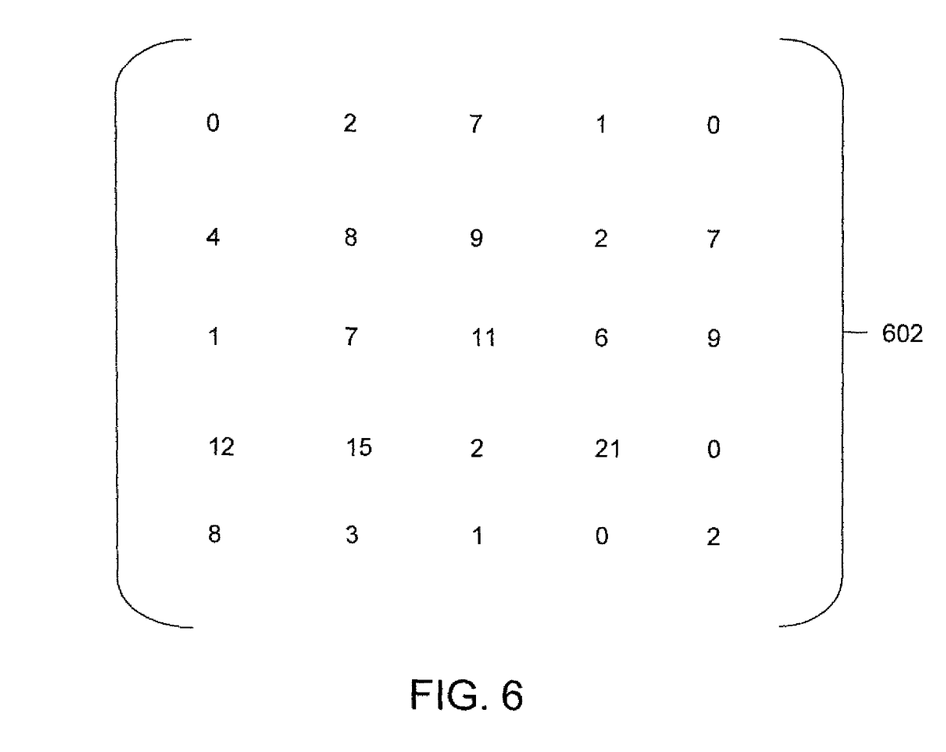
FIG. 6 illustrates a matrix that may be represented using an ordered data structure, in accordance with another embodiment of the invention.

FIG. 6 illustrates a matrix 602 that may be represented using an ordered data structure, in accordance with another embodiment of the invention.

In order to represent a matrix using the ordered data structure, a plurality of keys is associated with the data elements. The values of the keys map onto the corresponding positions of the associated ordered data elements in the matrix. In an embodiment of the invention, the position of a data element in the matrix may correspond to the number of rows and columns corresponding to the data element. For example, a data element with a value of '9' may be present at row number 2 and column number 3 in matrix 602. Further, the value of a key associated with the data element may be set to '2, 3' such that the value of the key maps onto the position of the data element in the matrix. In other words, the value of the keys associated with the data elements may be set to '(row number, column number)' wherein 'row number' and 'column number' corresponds to the row and column number in which the data element is present in the matrix.

In another embodiment of the invention, the key value may correspond to the position count of the data element in the matrix. For example, the first data element in matrix 602 has a value of '0' and a position count of '1'. Therefore, the value of a key corresponding to the first data element may have the value of '1'. Similarly, a data element with a value of '21' may be associated with a key having a value of '19'.

Figure 7:
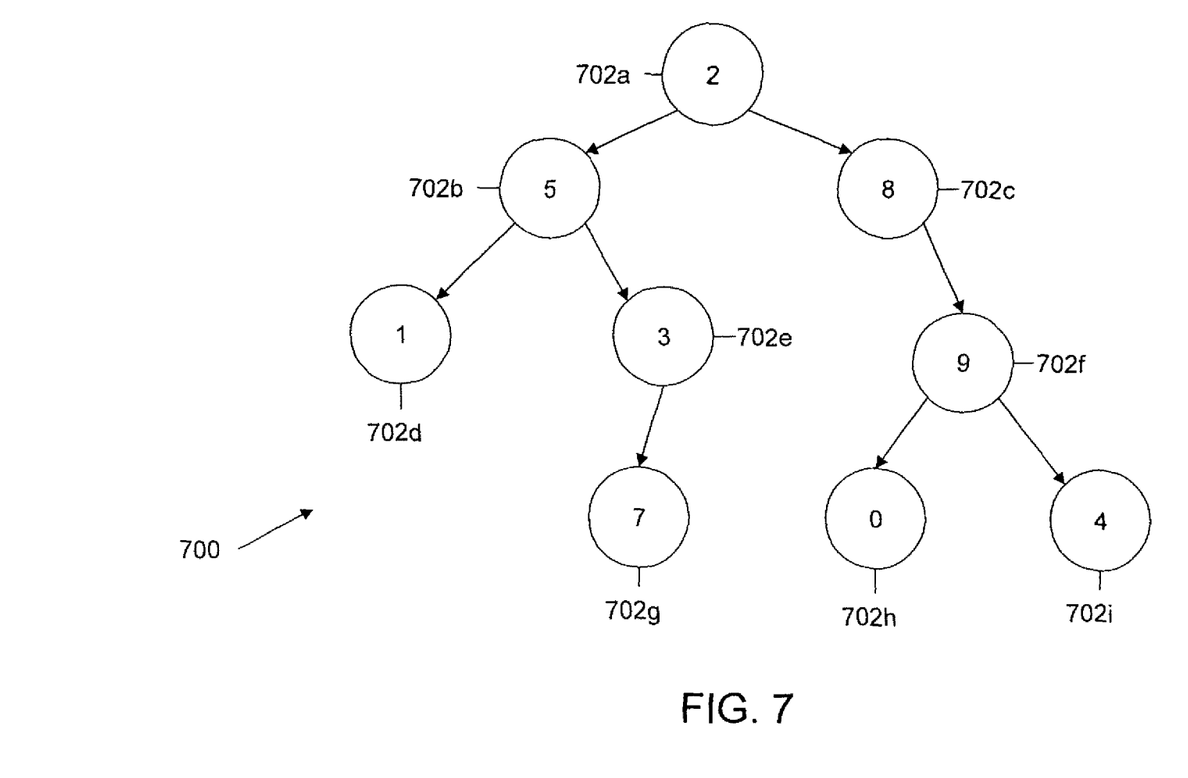
FIG. 7 illustrates a tree that may be represented using an ordered data structure, in accordance with yet another embodiment of the invention.

FIG. 7 illustrates a tree 700 that may be represented using an ordered data structure, in accordance with yet another embodiment of the invention.

Tree 700 includes a plurality of nodes 702a, 702b, 702c, 702d, 702e, 702f, 702g, 702h and 702i, hereinafter referred to as nodes 702. One or more keys are generated and associated with nodes 702 wherein each key is associated with at least one of the plurality of nodes 702.

The values of the keys correspond to the value of the data element stored in nodes 702. Further, the keys are associated with one or more children nodes of the parent nodes. For example, corresponding to node 702a, a key with a value of the data element stored in node 702a, i.e., '2' may be generated. Thereafter, the key may be associated with the children nodes of parent node 702a, i.e., node 702b and node 702c. Similarly, a key with a value of '5' may be generated for node 702b. Subsequently, the key corresponding to node 702b may be associated with the children nodes of node 702b, i.e., node 702d and node 702e. Thereafter, the data elements with the associated keys may be stored in an ordered data structure.

Therefore, tree 700 may be represented using an ordered data structure such as a hash. Further, all children nodes associated with each key may be stored in a data structure such as a linked list.

The method and computer program product for creating an ordered data structure has a number of advantages. Since the keys are decoupled from each other and from the data elements, insertion or deletion of data elements from the data structure does not necessitate updating of the keys, thereby reducing the processing time. Further, since the keys do not store a reference of the succeeding data element, corruption or loss of an element in the data structure does not render the subsequent data elements inaccessible. Also, a data element and the corresponding key may be deleted from the ordered data structure without traversing the data elements that precede the data element to be deleted. Further, the list of data elements stored in the ordered data structure may be fetched independently without accessing the corresponding keys. The independent access of data elements minimizes access to the ordered data structure thereby reducing chances of corruption.

The method for creating an ordered data structure for storing a plurality of data elements, as described in the present invention, may be embodied in the form usable through a computer system. Typical examples of a computer system include a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. The computer further comprises a microprocessor, which is connected to a communication bus. The computer also includes a memory, which may include Random Access Memory (RAM) and Read Only Memory (ROM). The computer system also comprises a storage device, which can be a hard disk drive or a removable storage drive such as a floppy disk drive, an optical disk drive, etc. The storage device can also be other similar means for loading computer programs or other instructions into the computer system. The computer system also includes a communication unit, which enables the computer to connect to other databases and the Internet through an Input/Output (I/O) interface. The communication unit also enables the transfer as well as reception of data from other databases. The communication unit may include a modem, an Ethernet card, or any similar device which enable the computer system to connect to databases and networks such as Local Area Network (LAN), Metropolitan Area Network (MAN), Wide Area Network (WAN), and the Internet. The computer system facilitates inputs from a user through an input device, accessible to the system through an I/O interface.

The computer system executes a set of instructions that are stored in one or more storage elements, in order to process the input data. The storage elements may also hold data or other information as desired. The storage element may be in the form of an information source or a physical memory element present in the processing machine.

The present invention may also be embodied in a computer program product for creating an ordered data structure for storing a plurality of data elements. The computer program product includes a computer usable medium having a set program instructions comprising a program code for creating an ordered data structure for storing a plurality of data elements. The set of instructions may include various commands that instruct the processing machine to perform specific tasks such as the steps that constitute the method of the present invention. The set of instructions may be in the form of a software program. Further, the software may be in the form of a collection of separate programs, a program module with a large program or a portion of a program module, as in the present invention. The software may also include modular programming in the form of object-oriented programming. The processing of input data by the processing machine may be in response to user commands, results of previous processing or a request made by another processing machine.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention, as described in the claims.

The invention claimed is:

1. A method for implementing an ordered data structure comprising a plurality of data elements, the method implemented using at least one processor comprising the steps of:
 a. ordering the plurality of data elements in a first order arrangement;
 b. generating a plurality of keys associated with the plurality of ordered data elements, each of the plurality of keys having a unique key-value, wherein the unique key values are generated in an ordered sequence;
 c. receiving an additional data element for insertion between a first data element and a second data element, wherein the second data element consecutively follows the first data element within the first order of arrangement;
 d. identifying a first unique key value associated with the first data element and a second unique key value associated with the second data element;
 e. generating a modified order of arrangement for the plurality of data elements, the modified order of arrangement comprising the additional data element inserted between the first data element and the second data element within the first order of arrangement, the step of inserting comprising:
  i. generating a third unique key value having a value lying between the first and second unique key values within the ordered sequence, such that locating the third unique key value between the first and second unique key values is consistent with the ordered sequence of unique key values; and
  ii. associating said third unique key value with the additional data element received for insertion,
  wherein the step of inserting the additional data element between the first data element and the second data element excludes modification of pointers linking the first data element or associated first unique key value with the second data element or associated second key value; and
 f. traversing the plurality of data elements in an order determined by the ordered sequence of unique key values including the third unique key value inserted between the first and second unique key values, said traversal resulting in traversal of the plurality of data elements in the modified order arrangement.

2. The computer implemented method according to claim 1, wherein one or more of the plurality of data elements is a data structure.

3. The computer implemented method according to claim 1, wherein the ordered data structure is a hash.

4. The computer implemented method according to claim 1, wherein each of the plurality of keys and each of the one or more keys is at least one of a real number, an alphabet or a combination thereof.

5. The computer implemented method according to claim 4, wherein generating the one or more keys for the one or more data elements comprises generating one or more ordered values corresponding to the one or more keys, the one or more ordered values lying between the range of values corresponding to the pair of keys.

6. The computer implemented method according to claim 1 further comprising deleting one or more data elements from the ordered data structure, wherein deleting the one or more data elements comprises:
 a. identifying one or more keys corresponding to the one or more data elements in the ordered data structure;
 b. deleting the one or more data elements from the ordered data structure; and
 c. deleting the one or more keys from the ordered data structure.

7. The computer implemented method according to claim 1, wherein each of the plurality of keys is a variable name generated at runtime.

8. The computer implemented method according to claim 1 further comprises representing a matrix using the ordered data structure.

9. The computer implemented method according to claim 8, wherein values of the one or more keys map onto corresponding positions of the associated ordered data elements in the matrix.

10. The computer implemented method according to claim 1 further comprises representing a tree using the ordered data structure.

11. The computer implemented method according to claim 10, wherein values of the one or more keys correspond to one or more parent nodes in the tree, the one or more keys being associated with corresponding one or more children nodes of the one or more parent nodes in the ordered data structure.

12. The computer implemented method according to claim 1, wherein the ordered data structure is implemented using object oriented programming.

13. A computer program product for use with a computer, the computer program product comprising a non-transitory computer usable medium having a computer readable program code embodied therein for implementing an ordered data structure comprising a plurality of data elements, the computer readable program code performing the steps of:
 a. ordering the plurality of data elements in a first order of arrangement;
 b. generating a plurality of keys associated with the plurality of ordered data elements, each of the plurality of keys having a unique key-value, wherein the unique key values are generated in an ordered sequence;
 c. receiving an additional data element for insertion between a first data element and a second data element, wherein the second data element consecutively follows the first data element within the first order of arrangement;
 d. identifying a first unique key value associated with the first data element and a second unique key value associated with the second data element;

e. generating a modified order of arrangement for the plurality of data elements, the modified order of arrangement comprising the additional data element inserted between the first data element and the second data element within the first order of arrangement, the step of insertion comprising:
  i. generating a third unique key value having a value lying between the first and second unique key values within the ordered sequence, such that locating the third unique key value between the first and second unique key values is consistent with the ordered sequence of unique key values; and
  ii. associating said third unique key value with the additional data element received for insertion;
  wherein the step of inserting the additional data element between the first data element and the second data element excludes modification of pointers linking the first data element or associated first unique key value with the second data element or associated second key value; and
f. traversing the plurality of data elements in an order determined by the ordered sequence of unique key values including the third unique key value inserted between the first and second unique key values, said traversal resulting in traversal of the plurality of data elements in the modified order of arrangement.

14. The computer program product according to claim 13, wherein one or more of the plurality of data elements is a data structure.

15. The computer program product according to claim 13, wherein the ordered data structure is a hash.

16. The computer program product according to claim 13, wherein each of the plurality of keys and each of the one or more keys is at least one of a real number, an alphabet or a combination thereof.

17. The computer program product according to claim 16, wherein generating the one or more keys for the one or more data elements comprises generating one or more ordered values corresponding to the one or more keys, the one or more ordered values lying between the range of values corresponding to the pair of keys.

18. The computer program product according to claim 13, wherein the computer readable program code further performs deleting one or more data elements from the ordered data structure, the computer readable program code performing:
  a. identifying one or more keys corresponding to the one or more data elements in the ordered data structure;
  b. deleting the one or more data elements from the ordered data structure; and
  c. deleting the one or more keys from the ordered data structure.

19. The computer program product according to claim 13, wherein each of the plurality of keys is a variable name generated at runtime.

20. The computer program product according to claim 13, wherein the computer readable program code further performs representing a matrix using the ordered data structure.

21. The computer program product according to claim 20, wherein values of the one or more keys map onto corresponding positions of the associated ordered data elements in the matrix.

22. The computer program product according to claim 13, wherein the computer readable program code further performs representing a binary tree using the ordered data structure.

23. The computer program product according to claim 22, wherein values of the one or more keys correspond to one or more parent nodes in the binary tree, the one or more keys being associated with corresponding one or more children nodes of the one or more parent nodes in the ordered data structure.

24. The computer program product according to claim 13, wherein the ordered data structure is implemented using object oriented programming.

* * * * *